F. H. WINTER.
POWER FACTOR REGULATOR.
APPLICATION FILED AUG. 4, 1913.
1,165,928.                                        Patented Dec. 28, 1915.
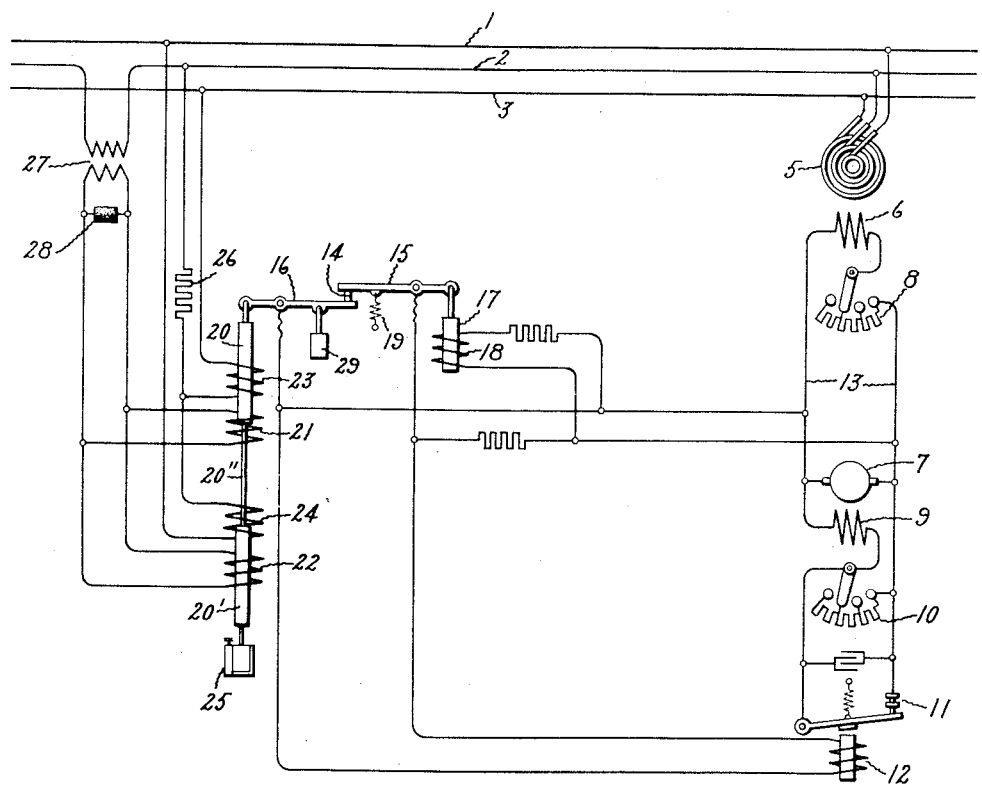
Witnesses:
Earl G. Klock
J. Ellis Glen
Inventor:
Fred H. Winter,
by Albert G. Davis
His Attorney.

UNITED STATES PATENT OFFICE.

FRED H. WINTER, OF SCHENECTADY, NEW YORK, ASSIGNOR TO GENERAL ELECTRIC COMPANY, A CORPORATION OF NEW YORK.

POWER-FACTOR REGULATOR.

1,165,928.      Specification of Letters Patent.      Patented Dec. 28, 1915.

Application filed August 4, 1913. Serial No. 782,799.

*To all whom it may concern:*

Be it known that I, FRED H. WINTER, a citizen of the United States, residing at Schenectady, county of Schenectady, State of New York, have invented certain new and useful Improvements in Power-Factor Regulators, of which the following is a specification.

My invention relates to alternating current systems of distribution wherein a synchronous dynamo-electric machine furnishes the wattless currents requisite for regulating and keeping constant the power factor of the system. It is well known that, by varying the field excitation of a separately excited synchronous machine connected to an alternating current distributing system, the phase relation between the current and potential in the line can be kept practically constant, the necessary wattless current being supplied by this machine. A device designed to automatically secure this result is illustrated in the patent to Tirrill, No. 1,084,674.

The present invention relates especially to improvements in the means for regulating the field excitation of such a machine by an apparatus of the type illustrated in the Tirrill patent.

The object of my invention is, then, to improve the construction of such a power factor regulator so that it shall be quick and accurate in its operation.

Another object of my invention is to arrange my regulator so that it shall be unaffected by changes in load upon the system.

In carrying out my invention, I use a modified form of the well-known Tirrill voltage regulator arranged to control the excitation of the field of a synchronous machine which is connected to the alternating current system. The construction of my regulator is similar to that shown in Tirrill #1,084,674, but differs therefrom in the construction and arrangement of the controlling means which is responsive to the power factor of the line. In the construction shown in the Tirrill patent this controlling means comprises two potential coils coacting with a floating current coil suspended by means of a stem from the alternating current control lever. In my improved construction I provide a pair of cores connected to the alternating current control lever. Associated with these cores are potential windings respectively connected across two mains of the system and arranged to exert opposed magnetic pulls on said lever through the medium of the cores. I then associate with each of said windings a current winding, the two current windings being connected in parallel and supplied with current from a current transformer connected in series with that main to which both potential windings are joined. The effect of this arrangement is to hasten or retard the time of the closing of the main control contacts in accordance with the fluctuations in phase between the current and potential, as will be explained more fully hereinafter, so as to increase or decrease the field excitation of the synchronous motor and thereby throw into the system either a leading or a lagging wattless current as may be required.

Since I am only concerned with the relative phase relations of current and voltage, it is desirable that the effect of the current windings should not be varied by changes in load and hence in the magnitude of the current in the system. I, therefore, provide means for keeping the magnitude of the current in the current windings substantially constant irrespective of the load on the system.

The accompanying drawing is a diagram illustrating an alternating current system of distribution embodying my invention.

The supply mains 1, 2, 3, of a three phase system furnish current to a load circuit (not shown), and to this system there is also connected a synchronous dynamo-electric machine 5 whose field coil 6 is energized by an exciter 7. A rheostat 8 in series with the field coil 6 enables the magnetization of the field of the synchronous machine to be adjusted. The circuit of the exciter field coil 9 also contains an adjustable resistor 10 which is shunted by the contacts 11, controlled by the relay 12, taking current from the exciter buses 13. The relay is controlled by a pair of floating contacts 14 carried on levers 15, 16, the former being attached to the movable core 17 of a direct current control magnet 18 which is connected across the mains of the exciter. The pull of the magnet is opposed by a spring 19. The other lever 16 is attached to cores 20 and 20' which are attached to a stem 20'' and move freely up and down through fixed windings 21, 22, 23 and 24. A dash-pot 25 is connected with said cores to retard their movement and the cores are counterbalanced by an adjustable weight as a shot cup 29. The windings 23 and 24 are each connected between a common main of the system and another main and are associated respectively with cores 20 and 20' in such a manner that they exert opposed pulls on such cores.

A suitable non-inductive resistance 26 is inserted in series with windings 23 and 24 to reduce the current in such windings. The windings 21 and 22 are connected in parallel to a current transformer 27 and are associated with and are preferably so wound as to oppose windings 23 and 24 respectively. This current transformer is connected in series with that main of the system to which both of the potential windings are connected. With the arrangement so far described satisfactory regulation of the synchronous motor can be obtained. I have found however that as the load on the line increases, the corresponding increase of current in the windings 21 and 22 tends to affect the sensitiveness of the regulating contacts, and in order to avoid this I place across the secondary of the current transformer a shunt 28 which gives a practically constant drop in potential for a large range of current flowing through it. Such a shunt might comprise a boron-carbon filament which is well known to possess this property.

While I have shown and described my cores 20 and 20' as being arranged in longitudinal alinement and connected to the stem 20, it will of course be understood that I am not limited to this specific arrangement as any arrangement whereby the resultant of two opposing pulls can be transmitted to the lever 16 may be used. It will also be clear that I may so design my windings 21, 22, 23 and 24 that either the current windings or the potential windings may be the predominating windings or I may so design them that the resultant at any particular power factor may be zero. In the latter case it will be clear that the weight 29 would then be of such value as to just balance the weight of cores 20, 20' and the stem 20".

The operation is as follows: Suppose that the synchronous machine is running without load, and the floating control contacts and other parts are adjusted so that the synchronous machine is excited to such a value as to give neither leading or lagging current; in other words let the power factor of the system be unity. Under these conditions the weight 29 is adjusted to such a value as to just counter-balance the resultant pull of the windings 21, 22, 23 and 24 and the weight of the cores 20, 20' and to hold the contact carried by the floating lever 16 in the proper position for effecting the control desired. The currents flowing in potential windings 23 and 24 are 120 electrical degrees apart while the current flowing in the current coils 21 and 22 is midway therebetween, since the current has been assumed to be in phase with the potential. In the arrangement as illustrated, the current in the current coils is leading the current in potential coil 24 and lagging the current in potential coil 23. If now the power factor of the system tends to vary, the current in the current coils will move more nearly into phase with one of the potential coils, while its phase displacement with reference to the other coil will become greater thereby, unbalancing the resultant pull on cores 20, 20' and causing the contact carried by the floating lever 16 to move upward or downward as the case may be. For example, if the current of the system tends to lag then the current in the current coil 22 comes more nearly into phase with that in potential coil 24, thereby decreasing the resultant pull on core 20', while the current in coil 21 moves more out of phase with that in potential coil 23 thereby increasing the resultant pull on core 20. As a result of this unbalancing the cores 20, 20' will be lowered thereby raising the contact carried by lever 16 and as a result increasing the excitation of the synchronous machine in a manner which is well understood in connection with the operation of the ordinary type of Tirrill voltage regulator so as to throw a leading current into the lines.

While I have assumed for the purpose of explanation that the power factor of the system was to be kept at unity, it will of course be understood that my system can be adjusted for any power factor desired.

It will be seen, then, that by means of my improved construction, I am able to avoid the use of a moving coil on a stem suspended from one of the control levers. This results in several distinct advantages. It reduces the weight to be carried on the pivot of the control lever, and avoids the use of flexible leads between a fixed and a moving element. Further, we are now dealing with the action of resultant fluxes on associated cores. The space between the fixed coil and the moving core may, therefore, be reduced to a minimum, whereas with the construction using a movable coil adapted to be attracted or repulsed by the interlinkage of lines of forces between it and the fixed coils, there must necessarily be a considerable air gap therebetween in order to allow for the necessary movement of the coil. Moreover, by the use of my arrangement for maintaining a constant current in the current coils, I obtain uniform action at all loads, and a sensitiveness not otherwise obtainable.

What I claim as new and desire to secure by Letters Patent of the United States, is:—

1. In a power factor regulator for a polyphase system of distribution which includes a synchronous dynamo electric machine and a pair of contacts for controlling the excitation of said machine, means responsive to the power factor of the system for controlling one of said contacts, said means comprising connected cores, a potential winding associated with each core and each connected between a common main and another main of the system and exerting opposed pulls on said cores, a current winding associated with each potential winding and connected in parallel with that main of the system to which both potential windings are connected, means for maintaining a constant current in said current windings and means for transmitting motion from said cores to said contact.

2. In a power factor regulator for a three-phase system of distribution which includes a synchronous dynamo electric machine, a pair of contacts for controlling the excitation of said machine, means responsive to the power factor of the system for controlling one of said contacts, said means comprising a pair of connected cores, a potential winding associated with each core and each connected between two mains of the system and exerting opposed pulls on said cores, a current winding associated with each potential winding and connected to receive current from that main of the system to which both potential windings are connected, means for maintaining a constant current in said current windings, and means for transmitting motion from said cores to said contact.

3. In combination, a polyphase system having distributing mains, a synchronous dynamo-electric machine connected thereto, means responsive to the power factor of said system controlling the excitation of said machine, said controlling means comprising a moving contact member, cores attached to said member, a fixed current coil and a fixed potential coil associated with each core for controlling its movement, and means for maintaining a constant current in said current coils, both of said current coils being responsive to changes in the phase relation of the current in one of said mains, one of said potential coils being responsive to change in the phase relation of the voltage between said first main and a second main, the other of said potential coils being responsive to changes in the phase relation of the voltage between the first main and a third main.

In witness whereof, I have hereunto set my hand this 2nd day of August, 1913.

FRED H. WINTER.

Witnesses:
HELEN ORFORD,
BENJAMIN B. HULL.